(12) United States Patent
Nureddine et al.

(10) Patent No.: US 10,348,068 B2
(45) Date of Patent: Jul. 9, 2019

(54) INSTALLATION GUARD FOR OVERHEAD UTILITY LINES

(71) Applicant: JLA Capital LLC, Lodi, CA (US)

(72) Inventors: Mark Jamal Nureddine, Lodi, CA (US); Jason Daniel Ogg, Apple Valley, CA (US)

(73) Assignee: JLA Capital LLC, Lodi, CA (US)

( * ) Notice: Subject to any disclaimer, the term of this patent is extended or adjusted under 35 U.S.C. 154(b) by 128 days.

(21) Appl. No.: 14/206,256

(22) Filed: Mar. 12, 2014

(65) Prior Publication Data

US 2015/0263501 A1    Sep. 17, 2015

(51) Int. Cl.
*H02G 1/02* (2006.01)

(52) U.S. Cl.
CPC ..................... *H02G 1/02* (2013.01)

(58) Field of Classification Search
CPC ............ H02G 7/05; H02G 7/053; H02G 7/20; H02G 7/205; H02G 1/02; H02G 1/04
USPC .................. 254/134.3 PA; 269/309, 296, 41; 174/45 R, 45 TD; 211/85.3; 248/68.1, 248/218.4, 219.2, 219.3, 214, 237.71
See application file for complete search history.

(56) References Cited

U.S. PATENT DOCUMENTS

| | | | |
|---|---|---|---|
| 1,084,130 A * | 1/1914 | Cargin | B25B 5/006 269/45 |
| 1,485,228 A * | 2/1924 | Johnson, Jr. | H02G 1/02 248/49 |
| 1,501,590 A * | 7/1924 | Floyd | H02G 1/02 248/49 |
| 1,793,732 A | 2/1931 | Bodendieck | |
| 1,853,600 A | 4/1932 | Bodendieck | |
| 1,979,688 A | 11/1934 | Hamer | |
| 2,571,246 A | 10/1951 | Hubbard | |
| 2,588,781 A | 3/1952 | Venus | |
| 2,599,010 A * | 6/1952 | Pernitz | B05C 13/00 269/100 |
| 2,728,462 A * | 12/1955 | Fincher | H02G 1/04 212/179 |
| 2,739,832 A | 3/1956 | Thorpe | |
| 2,902,257 A | 9/1959 | Young | |
| 3,080,448 A | 3/1963 | Nordstrom | |
| 4,466,506 A * | 8/1984 | Dolenti | H02G 1/02 182/2.1 |
| 4,500,077 A * | 2/1985 | Coxon | B25B 5/003 269/45 |
| 5,533,710 A | 7/1996 | Sauber | |

(Continued)

FOREIGN PATENT DOCUMENTS

| | | | | |
|---|---|---|---|---|
| FR | 487373 A | * | 6/1918 | ............... H02G 1/02 |
| FR | 2593332 A1 | * | 7/1987 | ............... H02G 1/04 |
| WO | WO 2015190814 A1 | * | 12/2015 | ............... H02G 1/02 |

*Primary Examiner* — Joseph J Hail
*Assistant Examiner* — J Stephen Taylor
(74) *Attorney, Agent, or Firm* — Knobbe, Martens, Olson & Bear, LLP

(57) ABSTRACT

An installation guard tool is disclosed that is installed on the end of a cross-arm of a utility pole. The guard tool has an adjustable height to extend above the insulators to keep the new, grounded conductor being installed from touching the existing, energized conductors below. The tool is semi-permanent and removable and can be installed at the beginning of an installation job and remain in place until the installation job is complete.

16 Claims, 4 Drawing Sheets

(56) References Cited

U.S. PATENT DOCUMENTS

| | | | | |
|---|---|---|---|---|
| 5,926,882 | A | * | 7/1999 | Veith ............... A61F 5/3761 269/45 |
| 5,984,287 | A | * | 11/1999 | Fitzsimmons ..... B23K 37/0452 269/17 |
| 7,387,294 | B2 | | 6/2008 | Kwon |
| 9,004,473 | B2 | * | 4/2015 | Perreault ............. A63H 17/26 269/296 |
| 2006/0248775 | A1 | * | 11/2006 | Wade ................ F41A 23/34 42/94 |
| 2008/0106020 | A1 | * | 5/2008 | Sherlock .......... B23K 37/0452 269/71 |
| 2013/0134369 | A1 | | 5/2013 | Wabnegger |

* cited by examiner

INSTALLATION GUARD FOR OVERHEAD UTILITY LINES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to overhead power line installation tools, and in particular, concerns a mechanism for preventing contact between new, grounded conductors and energized conductors.

Description of the Related Art

For a single wood utility pole structure, multiple cross-arms may extend from the pole at staggered heights oriented to allow power lines to run both north-south and east-west. The energized conductors run through insulators that are installed on each cross-arm. When installing a re-conductor line or stringing in new conductor lines over any energized conductors, care must be taken to prevent the new lines from contacting the energized conductors.

Typically, products such as blankets and rubber gloves are used when installing a new conductor. For each location or power pole, a blanket or cover is placed over the energized conductors and insulators, preventing contact between the new conductor being installed and the existing energized conductor. Each location or power pole requires a separate blanket or cover and the installer must return at the end of each day to remove the blanket or cover.

From the foregoing, it will be apparent that there is a need for an improved device to prevent contact between new, grounded conductor and energized conductors that is easy to install and can be semi-permanent if an installation takes more than one day.

SUMMARY OF THE INVENTION

As described herein, the present disclosure can relate to an apparatus for an electrical conductor installation guard, where the apparatus includes a support member defining a first end, a second end, and a middle portion between the first end and the second end, the middle portion defining a first opening dimensioned to receive an adjustment member, the adjustment member defining a first end and a second end, the second end configured with a plurality of adjustment notches, a first member coupled to the first end of the support member such that the first member and the support member form approximately a 90 degree angle, a second member coupled to the second end of the support member such that the second member and the support member form approximately a 90 degree angle, an attachment member having a first end and a second end, the attachment member defining a second opening at the second end dimensioned to receive the second end of the adjustment member, the second opening further dimensioned to receive a first locking member that passes through an outer surface of the second opening to engage with one of the plurality of adjustment notches of the adjustment member to releasably retain the adjustment member to the attachment member, a hanging member having a first side, a second side opposite the first side, a top portion between the first side and the second side, and a bottom portion between the first side and the second side opposite the top portion, the bottom portion having a notch dimensioned to receive and support the attachment member, the first side and the second side of the hanging member each having a plurality of holes dimensioned to receive a second locking member such that the second locking member passes through a hole in the first side and a hole in the second side, the hanging member dimensioned to receive a cross-arm of a utility pole, and a securing member affixed to the first end of the attachment member, the securing member defining a U-shaped bracket configured to clamp to the cross-arm of the utility pole with a plurality of clamping members.

In some aspects, an apparatus for preventing contact between electrical conductors includes an attachment member having a first end and a second end, the attachment member configured to removably attach to a cross-arm of a utility pole, an adjustable member having a first end and a second end, second end of the adjustable member configured to removably attach to the second end of the attachment member, forming an approximately 90 degree angle, a U-shaped member configured to attach to the first end of the adjustable member such that the U-shaped member lies in substantially the same plane as the adjustable member, and a coupling mechanism configured to releasably retain the attachment member to the cross-arm of the utility pole. The U-shaped member is configured to support a grounded conductor above an energized conductor. In some aspects, the coupling mechanism comprises a bracket and locking pins. In some aspects, the coupling mechanism includes a hanging member having a first side, a second side opposite the first side, a top portion between the first side and the second side, and a bottom portion between the first side and the second side opposite the top portion, the bottom portion having a notch dimensioned to receive and support the attachment member, the first side and the second side of the hanging member each having a plurality of holes dimensioned to receive a locking member such that the locking member passes through a hole in the first side and a hole in the second side, the hanging member dimensioned to receive a cross-arm of a utility pole. In some aspects, the locking member comprises a pin. In some aspects, the second end of the adjustable member comprises a plurality of adjustment notches configured to receive an adjustment locking member. In some aspects, the adjustment locking member comprises a locking pin.

In another aspect, an apparatus for stringing conductors onto an existing power pole wherein the power pole has existing conductors at a first vertical position formed on a first cross-piece and a second vertical position formed on a second cross-piece that is higher than the first cross-piece, wherein the apparatus includes a mounting member that engages with the power pole so as to extend outward from the first cross-piece, a vertical member that extends upwards from the mounting member to a third vertical position that is between the first and second vertical positions, a retaining member that is formed on the vertical member so as to be positioned at the third vertical position such that conductors being mounted on the second vertical position are inhibited from falling to the first vertical position by the retaining member. In some aspects, the retaining member extends in a direction that is substantially orthogonal to the direction of the first cross-piece. In some aspects, the retaining member includes vertically extending end members that retain the conductors onto the retaining member. In some aspects, the mounting member includes a first member that defines an opening that receives the first cross-piece. In some aspects, the mounting member includes a clamp member that connects to the first cross piece at a location that is spaced from the first member. In some aspects, the mounting member is extendable in the direction of the first cross-piece. In some aspects, the vertical member is extendable in the vertical direction so that the third vertical position is adjustable between the first and second vertical positions. In some aspects, the mounting member, the vertical member and the retaining member are formed of cylindrical pipe members. In some aspects, the mounting member, the vertical member and the retaining member are formed of plastic. In some aspects, the conductors on the first cross-piece extend in a first direction and the conductors being installed on the second cross-piece extend in a second direction that is substantially orthogonal to the first direction.

DETAILED DESCRIPTION OF THE PREFERRED EMBODIMENT

Figure 1:
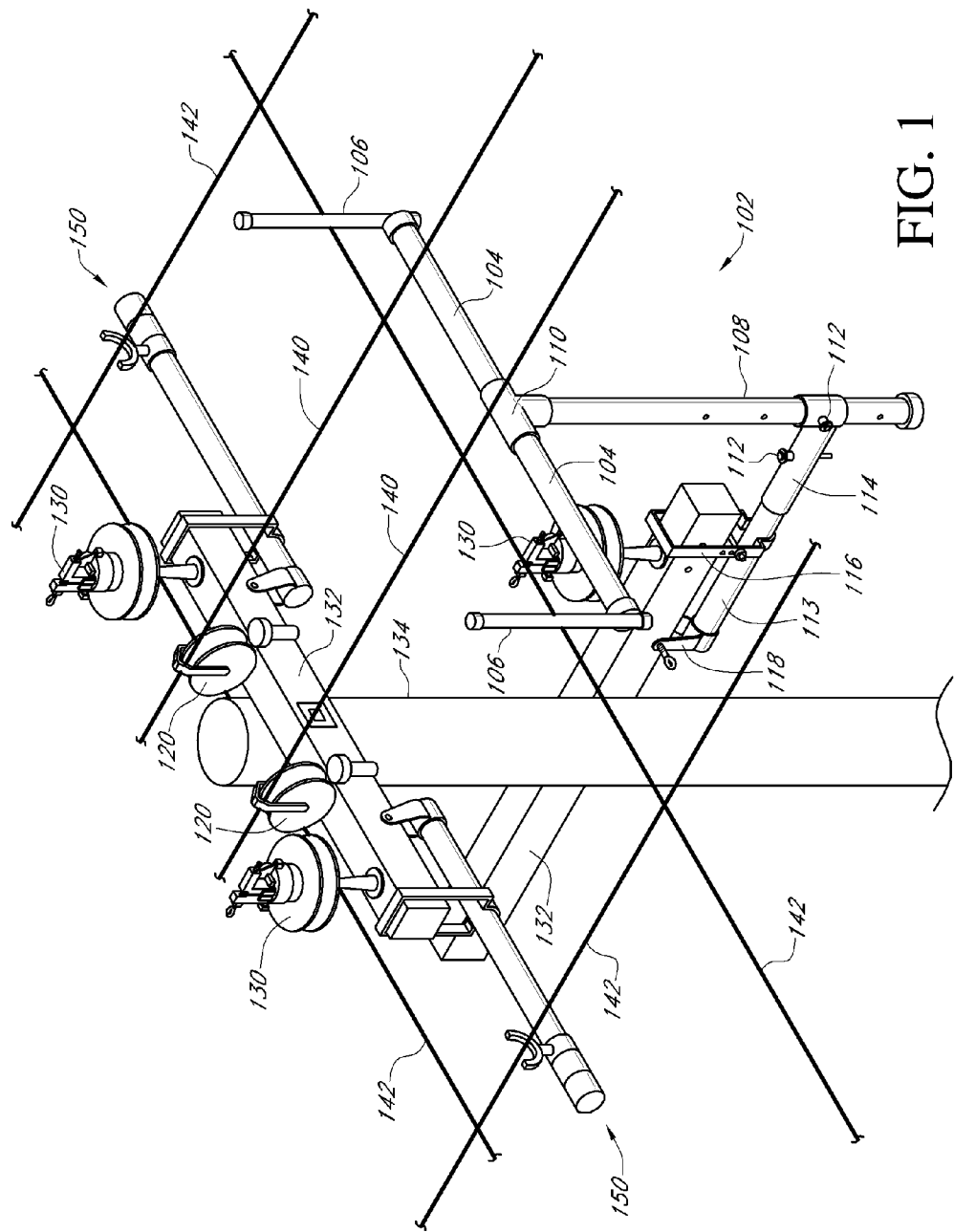
FIG. 1 is a schematic illustration of an installation guard tool having a member positioned to prevent contact between a new, grounded conductor and an energized conductor.

Various aspects, advantages, and novel features of the present teachings will become apparent upon reading the following description and upon reference to the accompanying drawings. In the drawings, similar elements have similar reference numerals.

FIG. 1 shows one embodiment of an installation guard tool 102 as installed for use on a cross-arm of a utility pole. The guard tool 102, or "buck guard" may be used as a semi-permanent and removable tool that may be used when installing a re-conductor or stringing in new conductor over any energized conductors. In some embodiments, the guard tool 102 is configured to fit on the end of a cross-arm 132 of a utility pole 134. The guard tool 102 has an adjustable height such that it can extend above the insulators 130 on the utility pole 134 to keep the new, grounded conductor 140 that is being pulled or installed from touching the existing, energized conductors 142 that are being pulled over. As shown in FIG. 1, the guard tool 102 may be used with other conductor installation components. For example, a hot arm 150 may be used to help separate energized conductors 142 from the new, grounded conductors 140 being pulled. Additionally, travelers' rollers 120 may be used to help guide the grounded conductors 140 as they are pulled.

Figure 2:
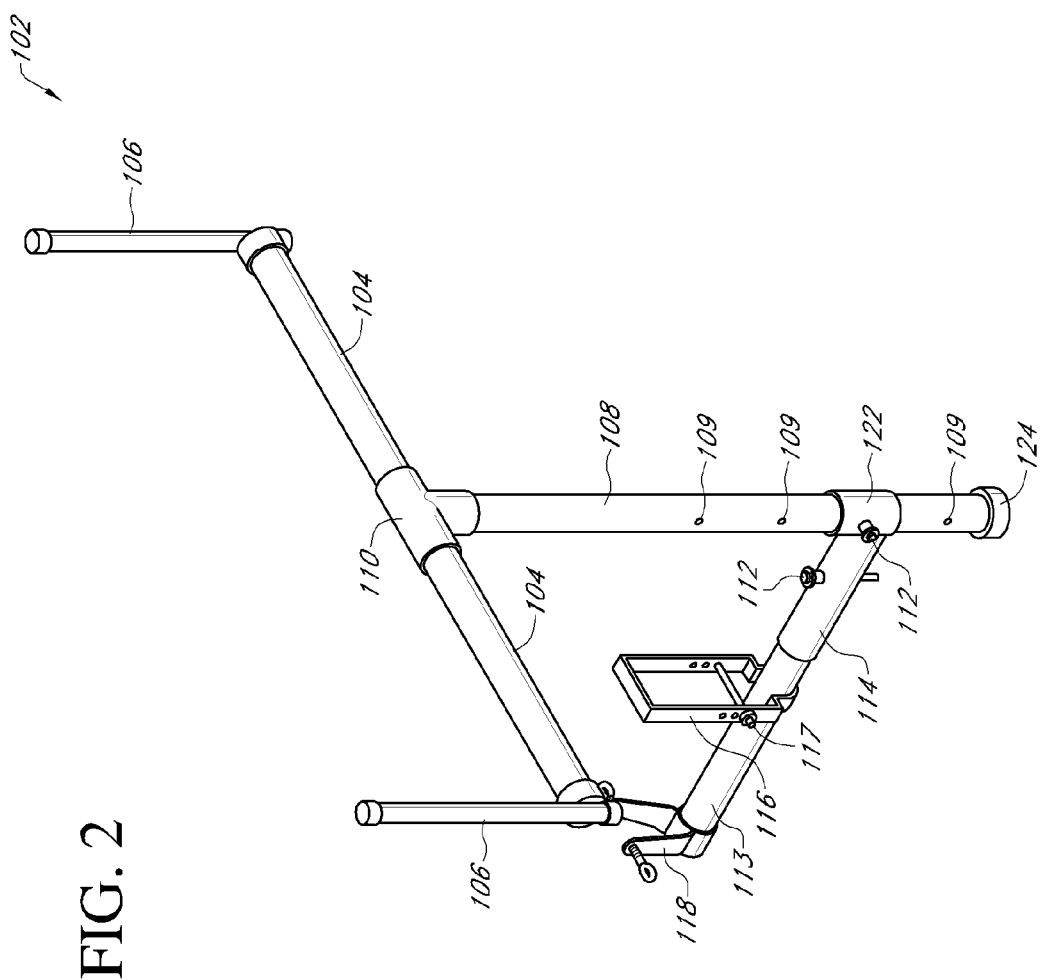
FIG. 2 is a right perspective schematic illustration of the installation guard tool shown in FIG. 1.
Figure 3:
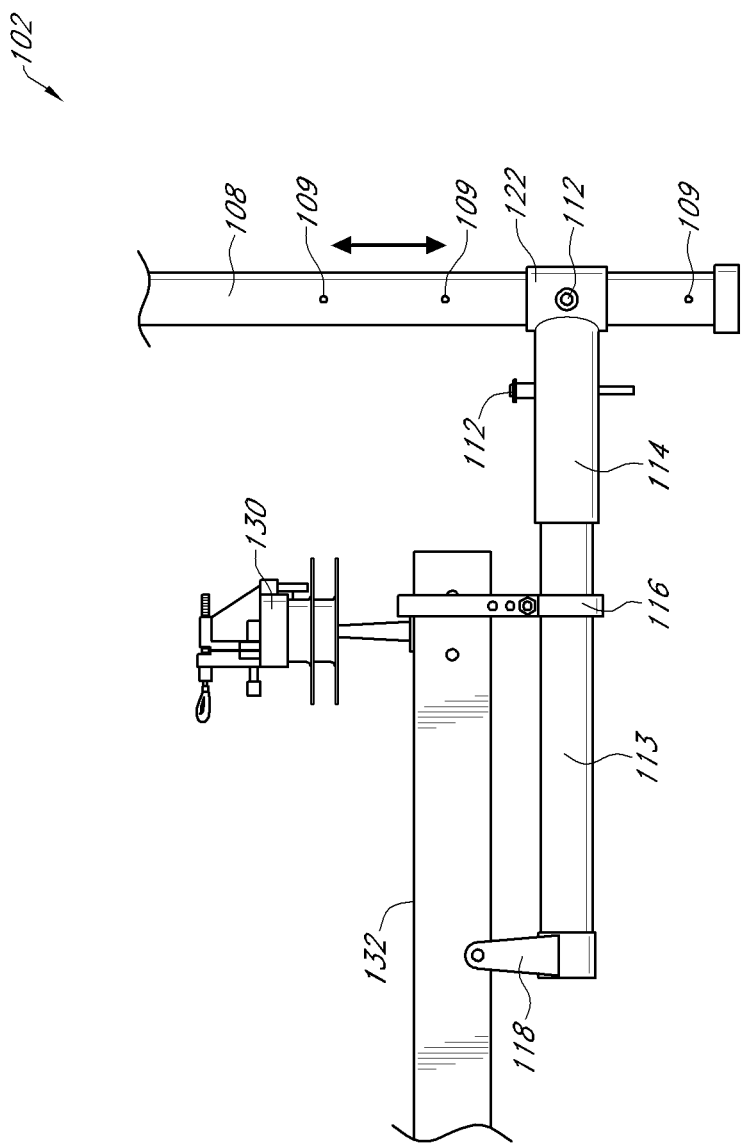
FIG. 3 is a partial side schematic illustration of the installation guard tool shown in FIG. 1 and further illustrating the vertical adjustment of the tool.
Figure 4:
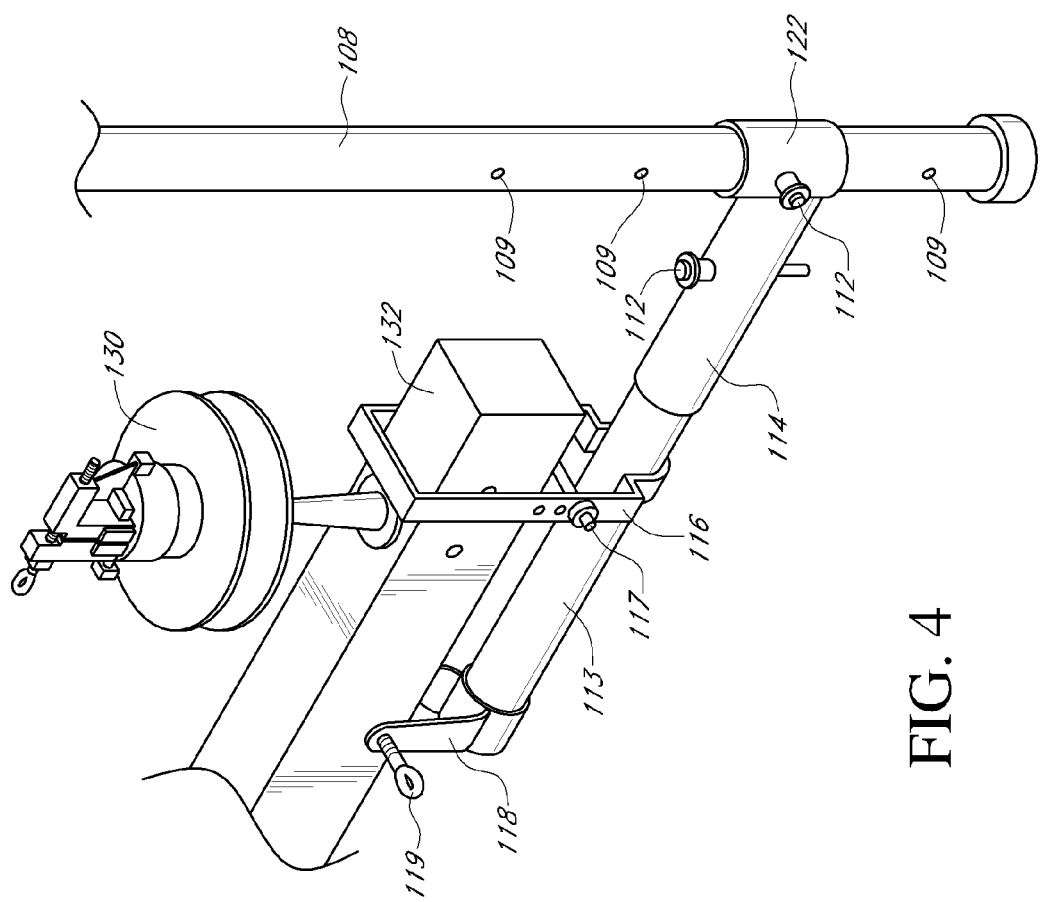
FIG. 4 is a partial schematic illustration of the installation guard tool as installed on a cross-arm of a utility pole.

FIG. 2 illustrates a guard tool 102, according to one embodiment. FIGS. 3 and 4 illustrate alternative views of the guard tool 102 coupled to a cross-arm of a utility pole. The guard tool 102 includes cross-arm extension members 113, 114 that are configured such that one cross-arm extension member 113 fits within the other cross-arm extension member 114 to provide an adjustable length. Once the desired length of the total cross-arm extension member 113, 114 is determined, a pin 112 may be inserted within aligned holes in both of the cross-arm extension members 113, 114 to securely prevent further extension or contraction of the cross-arm extension members 113, 114. Desirably, the total length of the cross-arm extension members 113, 114 when coupled together is between about 2 feet and 4 feet.

In some embodiments, at one end of the cross-arm extension members 113, 114 is a tensioning member 118 with a pin 119. The tensioning member 118 is configured to clamp onto the sides of the cross-arm 132 of the utility pole 134 to secure the guard tool 102 to the cross-arm 132. Additionally, an encircling support member 116 may also be used to further support the guard tool 102 on the cross-arm 132. Preferably, the encircling support member 116 has two straight sides connected by a straight upper segment that defines an opening. The opening may be configured such that the encircling support member 116 can be slipped over the end of the cross-arm 132 such that the cross-arm 132 extends through the opening, as shown in FIG. 1. The encircling support member 116 may also include a notch opposite the upper segment. The notch may be configured such that the cross-arm extension members 113, 114 fit within the notch. In some embodiments, a pin 117 may fit through aligned holes in both sides of the encircling support member 116 to provide further support for the guard tool 102.

With further reference to FIGS. 2-4, the cross-arm extension member 114 also includes a receiving portion 122 configured to receive an adjustable member 108. The receiving portion 122 is located on an end of the cross-arm extension member 114 opposite the end that is configured to receive the other cross-arm extension member 113. The receiving portion 122 defines an opening that is oriented at an approximately 90 degree angle from the axis defined by the length of the cross-arm extension member 114. As shown in FIGS. 2-4, the adjustable member 108 is configured to fit within the opening defined by the receiving portion 122. When the adjustable member 108 is fit within the opening defined by the receiving portion 122, the adjustable member 108 extends at an approximately 90 degree angle from the cross-arm extension members 113, 114.

Desirably, the adjustable member 108 is further configured with a plurality of holes 109. The receiving portion 122 is also configured with a hole. After the adjustable member 108 is inserted into the receiving portion 122 and adjusted to a predetermined height, the adjustable member 108 is secured to this height by a pin 112. The pin 112 passes through the hole in the receiving portion 122 that is aligned with one of the holes 109 in the adjustable member 108 to secure the adjustable member 108 at a predetermined height. In a preferred embodiment, the length of the adjustable member 108 may be about 2 feet to about 4 feet. In some embodiments, a cap 124 may be placed on one end of the adjustable member 108 to prevent the adjustable member 108 from falling out of the receiving portion 122 when the pin 112 is removed.

With further reference to FIGS. 2-4, a connecting member 110 may be coupled to the other end of the adjustable member 108. The connecting member 110 is desirably a T-shaped member. The connecting member 110 preferably defines a first opening to receive an end of the adjustable member 108 and a second opening oriented at approximately 90 degrees from the first opening. The second opening preferably is configured to receive a wire support member 104. The wire support member 104 may be a single member or may be two members that are attached at the connecting member 110 to form a single length. The wire support member 104, when inserted into the connecting member 110, desirably forms a "T" shape with the adjustable member 108. The wire support member 104 is configured such that, when the guard tool 102 is installed on the cross-arm 132, the wire support member is wide enough to support a new, ungrounded conductor, such as conductor 140 shown in FIG. 1, above at least one energized conductor, such as conductor 142. Desirably, the wire support member 104 has a length of between about 3 feet to about 7 feet.

Catching members 106 may be coupled to both ends of the wire support member 104. The catching members 106 may be coupled to the ends of the wire support member 104 using caps or by any other coupling mechanism. The catching members 106 desirably are configured such that when a new, grounded conductor is pulled and the guard tool 102 is installed, the grounded conductors are both supported and constrained within the U-shaped opening defined by the catching members 106 and the wire support member 104.

As illustrated most clearly in FIGS. 3 and 4, the guard tool 102 desirably hangs from a cross-arm 132 such that the cross-arm extension member 113, 114 is substantially below the cross-arm 132.

An advantage of the tool 102 over existing conductor installation tools is that the tool 102 is semi-permanent and may be installed to the cross-arm of a utility pole for the duration of an installation job. Unlike a flexible and unsecured wire cover such as a cover or blanket, the tool 102 does not need to be set up at the start of each working day and removed at the end of the working day. By securely fastening to the cross-arm for the duration of the installation job, the tool 102 reduces installation time.

Additionally, the tool 102 may be easily installed on any cross-arm extending from a utility pole. The tool 102 is configured such that the supporting member 116 encircles the cross-arm 132 to provide a hanging support for the tool 102. To prevent rotation of the tool 102 and for further stability, the tensioning member 118 is secured to the sides of the cross-arm 132 with a removable pin. This installation desirably does not require drilling into the cross-arm 132 but rather provides a simple and easy installation that is also secure and durable.

A further advantage of the tool 102 over existing conductor installation tools is that the tool 102 is adjustable. As discussed above, the adjustable member 108 is configured with a plurality of holes that can be aligned with a hole in the receiving portion 122 of the cross-arm extension member 114. Depending on the height of the energized conductors on the utility pole, the adjustable member 108 can be adjusted such that the wire support member 104 is above the energized conductors. Consequently, as the grounded conductors are installed or strung over existing energized conductors, the grounded conductors are supported above the energized conductors. The guard tool 102 therefore prevents contact between the two sets of conductors by elevating and supporting the grounded conductors above the energized conductors until the installation job is completed.

It will be appreciated that the foregoing description has shown, illustrated and described embodiments of the present invention. It will be appreciated however that various changes to the form, the implementation or the method of use of the present invention could be made by those skilled in the art without departing from the spirit of the present invention. Hence, the scope of the present invention should not be limited to the foregoing discussion but should be defined by the appended claims.

What is claimed is:

1. An apparatus for preventing grounded conductors from touching energized conductors, the apparatus comprising:
   a support member defining a first end, a second end, and a middle portion between the first end and the second end, the middle portion defining a first opening that receives an adjustment member, the adjustment member defining a first end and a second end, the second end having a plurality of adjustment notches;
   a first member coupled to the first end of the support member such that the first member and the support member form approximately a 90 degree angle;
   a second member coupled to the second end of the support member such that the second member and the support member form approximately a 90 degree angle;
   an attachment member having a first end and a second end, the attachment member defining a second opening at the second end that receives the second end of the adjustment member, the second opening that receives a first locking member that passes through an outer surface of the second opening to engage with one of the plurality of adjustment notches of the adjustment member to releasably retain the adjustment member to the attachment member;
   a hanging member having a first side, a second side opposite the first side, a top portion between the first side and the second side, and a bottom portion between the first side and the second side opposite the top portion, the bottom portion having a notch dimensioned to receive and support the attachment member, the first side and the second side of the hanging member each having a plurality of holes that receive a second locking member such that the second locking member passes through one of the plurality of holes in the first side and one of the plurality of holes in the second side, the hanging member dimensioned to receive a cross-arm of a utility pole wherein the hanging member engages a mid-point of the attachment member; and
   a securing member affixed to the first end of the attachment member so as to be spaced from the hanging member, the securing member defining a U-shaped bracket configured to clamp to the cross-arm of the utility pole, the U-shaped bracket comprising a plurality of clamping members.

2. An apparatus for preventing contact between electrical conductors, the apparatus comprising:
   an attachment member having a first end and a second end, the attachment member configured to removably attach to a cross-arm of a utility pole, the attachment member extending along a first longitudinal axis;
   an adjustable member having a first end and a second end and extending along a second longitudinal axis, the first and second longitudinal axes forming an approximately 90 degree angle relative to each other, the second end of the adjustable member configured to removably attach to the second end of the attachment member;
   a U-shaped member that attaches to the first end of the adjustable member wherein the U-shaped member extends in a direction that is orthogonal to the first and second longitudinal axes; and
   a coupling mechanism configured to releasably retain the attachment member to the cross-arm of the utility pole wherein the coupling mechanism includes a first member that defines an opening configured to receive the cross-arm and a second member configured to attach to the cross-arm wherein the first member is attached to a mid-point of the attachment member and the second member is attached to the attachment member proximal to the first end of the attachment member so as to be spaced and physically separated from the first member;
   wherein the U-shaped member is configured to support a grounded conductor above an energized conductor.

3. The apparatus of claim 2, wherein the coupling mechanism comprises a bracket and a locking pin.

4. The apparatus of claim 3, wherein the coupling mechanism comprises a hanging member having a first side, a second side opposite the first side, a top portion between the first side and the second side, and a bottom portion between the first side and the second side opposite the top portion, the bottom portion having a notch dimensioned to receive and support the attachment member, the first side and the second side of the hanging member each having a plurality of holes dimensioned to receive a locking member such that the locking member passes through one of the plurality of holes in the first side and one of the plurality of holes in the second side, the hanging member dimensioned to receive a cross-arm of a utility pole.

5. The apparatus of claim 4, wherein the locking member comprises a pin.

6. The apparatus of claim 2, wherein the second end of the adjustable member comprises a plurality of adjustment notches configured to receive an adjustment locking member.

7. The apparatus of claim 6, wherein the adjustment locking member comprises a locking pin.

8. An apparatus for stringing conductors onto an existing power pole wherein the power pole has existing conductors at a first position formed on a first cross-piece and a second position formed on a second cross-piece that is spaced above the first cross-piece, wherein the apparatus comprises:
a mounting member having a first and a second end, the mounting member extending along a first longitudinal axis and configured to engage with the first cross-piece, the mounting member comprising a first member that defines an opening configured to receive the first cross-piece and a second member configured to attach to the first cross-piece, wherein the first member is located approximately at a mid-point of the mounting member and the second member is located proximal to the second end of the mounting member so as to be spaced and physically separated from the first member;
an adjustment member that extends along a second longitudinal axis substantially orthogonal to the first longitudinal axis and is configured to extend to a third position that is between the first and second positions; and
a retaining member on the adjustment member configured to be positioned at the third position when the adjustment member extends to the third position such that conductors mounted on the second position are inhibited from falling to the first position by the retaining member.

9. The apparatus of claim 8, wherein the retaining member extends in a direction that is substantially orthogonal to the direction of the mounting member.

10. The apparatus of claim 8, wherein the retaining member includes elongate end members that retain the conductors onto the retaining member.

11. The apparatus of claim 8, wherein the mounting member has an adjustable length.

12. The apparatus of claim 8, wherein the adjustment member is extendable along the second longitudinal axis so that the third position is adjustable between the first and second positions.

13. The apparatus of claim 8, wherein the mounting member, the adjustment member and the retaining member are formed of cylindrical pipe members.

14. The apparatus of claim 13, wherein the mounting member, the adjustment member and the retaining member are formed of plastic.

15. An apparatus for stringing conductors onto an existing power pole wherein the power pole has existing conductors at a first position formed on a first cross-piece and a second position formed on a second cross-piece that is spaced above the first cross-piece, wherein the apparatus comprises:
a mounting member having a first and second end and extending along a first longitudinal axis, wherein the mounting member is configured to engage with the the first cross-piece such that the first end of the mounting member extends beyond an end of the first cross-piece, wherein the mounting member has an adjustable length, the mounting member comprising a first member that defines an opening configured to receive the first cross-piece and a second member that defines a clamp configured to clamp to the first cross-piece, the first member located approximately at a mid-point of the mounting member and the clamp is located proximal the second end of the mounting member so as to be spaced and physically separated from the first member;
a support member that extends along a second longitudinal axis substantially orthogonal to the first longitudinal axis and is configured to extend to a third position that is between the first and second positions; and
a retaining member coupled to the support member and configured to be positioned at the third position when the support member extends to the third position such that conductors mounted on the second position are inhibited from falling to the first position by the retaining member.

16. An apparatus for stringing conductors onto an existing power pole wherein the power pole has existing conductors at a first vertical position formed on a first cross-piece and a second vertical position formed on a second cross-piece spaced above the first cross-piece, wherein the apparatus comprises:
a mounting member having a first end and a second end and extends along a first longitudinal axis, the mounting member configured to engage the first cross-piece such that the first end of the mounting member extends outward past an end of the first cross-piece, the mounting member comprising a first member that defines an opening configured to receive the first cross-piece and a second member that defines a clamp configured to clamp to the first cross-piece, the first member attached to a mid-point of the mounting member and the clamp attached to the second end of the mounting member so as to be spaced and physically separated from the first member;
a support member that extends along a second longitudinal axis substantially orthogonal to the first longitudinal axis and is adjustably coupled to the mounting member, the support member configured to extend to a third vertical position that is between the first and second vertical positions, the support member being adjustable relative to the mounting member so that the third vertical position is adjustable between the first and second vertical positions; and
a retaining member that is formed on the support member and configured to be positioned at the third vertical position such that conductors mounted on the second vertical position are inhibited from falling to the first vertical position by the retaining member.

* * * * *